United States Patent
Schwab et al.

(10) Patent No.: US 9,593,894 B2
(45) Date of Patent: Mar. 14, 2017

(54) THERMAL INTERFACE MATERIAL AND RELATED SYSTEMS AND METHODS

(71) Applicant: GM GLOBAL TECHNOLOGY OPERATIONS LLC, Detroit, MI (US)

(72) Inventors: Leo Schwab, Roseville, MI (US); Chih-Cheng Hsu, Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 14/137,425

(22) Filed: Dec. 20, 2013

(65) Prior Publication Data
US 2015/0180096 A1    Jun. 25, 2015

(51) Int. Cl.
| | |
|---|---|
| *F28F 21/08* | (2006.01) |
| *H01M 10/653* | (2014.01) |
| *H01M 10/6567* | (2014.01) |
| *F28F 3/12* | (2006.01) |
| *F28F 13/00* | (2006.01) |

(52) U.S. Cl.
CPC ............. *F28F 21/08* (2013.01); *F28F 3/12* (2013.01); *F28F 13/00* (2013.01); *H01M 10/504* (2013.01); *H01M 10/5075* (2013.01); *F28F 2013/006* (2013.01)

(58) Field of Classification Search
None
See application file for complete search history.

(56) References Cited

U.S. PATENT DOCUMENTS

| | | | | |
|---|---|---|---|---|
| 2002/0186535 A1* | 12/2002 | Smith | .................... | D03D 15/00 361/704 |
| 2010/0330408 A1* | 12/2010 | Yoon | .................. | H01M 2/0262 429/120 |
| 2011/0318626 A1 | 12/2011 | Bartenschlager | | |
| 2012/0107663 A1* | 5/2012 | Burgers | .................... | F28F 3/06 429/120 |

FOREIGN PATENT DOCUMENTS

CN    102301523 A    12/2011

OTHER PUBLICATIONS

Definition of "conform" from www.dictionary.com (Sep. 11, 2016).*
CN102301523A—Machine Translation of Application.

* cited by examiner

*Primary Examiner* — Miriam Stagg
*Assistant Examiner* — Carmen Lyles-Irving
(74) *Attorney, Agent, or Firm* — Jared L. Cherry; Phillips Ryther & Winchester (57) ABSTRACT

Disclosed herein are a variety of embodiments of a thermal interface material that may be used in a variety of systems and methods to improve heat transfer. One embodiment consistent with the present disclosure includes a heat dissipation system that includes a heat source and a heat sink. A thermal interface material may be at least partially disposed between the heat source and the heat sink. The thermal interface material may include a plurality of strands of thermally conductive material woven into a pattern. The thermal interface material may be configured to conform to the contact surfaces of the heat source and the heat sink to thereby increase transference of heat between the heat source and the heat sink.

11 Claims, 8 Drawing Sheets

THERMAL INTERFACE MATERIAL AND RELATED SYSTEMS AND METHODS

TECHNICAL FIELD

This disclosure relates to thermal interface materials. More particularly, but not exclusively, this disclosure relates to a woven thermal interface material that may be disposed between a heat source and a heat dissipating component.

BACKGROUND

A variety of heat sources may be cooled using a heat sink. A heat sink may be configured to dissipate heat to the surrounding environment. Some heat sinks may also include heat transfer elements such as radiators, fans, heat pipes, liquid cooling elements, phase-change cooling elements, and/or other features. A thermal interface material may be used to improve the thermal coupling between a heat source and a heat sink. The thermal interface material may be disposed between contact surfaces of the heat source and the heat sink at which heat is transferred.

Contact surfaces on the heat source or the heat sink may have variations caused by variations in materials and/or manufacturing processes. A thermal interface material may, for example, be used to fill gaps between the heat source and the heat sink occurring due to such variations. Such gaps, if not bridged by a thermal interface material, may decrease the thermal coupling between the heat source and the heat sink, thereby decreasing the efficiency with which heat may be transferred from the heat source to the heat sink.

One common form of thermal interface material is a heat-conductive paste or grease that is spread in a layer between the heat source and a heat sink. Pressure between the heat source and heat sink may cause the thermal interface material to spread from its initial position to cover the entire contact surface. A thermal pad, which may include a thermal paste or grease, may fill voids between the heat source and a heat sink. The thermal conductivity of many pastes or greases used as thermal interface materials is relatively low. For example, some commercially available thermal pastes or greases have a thermal conductivity value between 1.5 to 3$\lambda$, where $\lambda$ is expressed in watts per meter kelvin (W/(m·K°)). In contrast, materials commonly used in heat sinks may have thermal conductivity values that are many times greater than such pastes or greases. For example, the thermal conductivity of aluminum is approximately 220$\lambda$, and the thermal conductivity of copper is approximately 390$\lambda$. The inventors of the present application have recognized that increasing the thermal conductivity of a thermal interface material may provide greater transference of heat and improved efficiency in certain applications.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Figure 1:
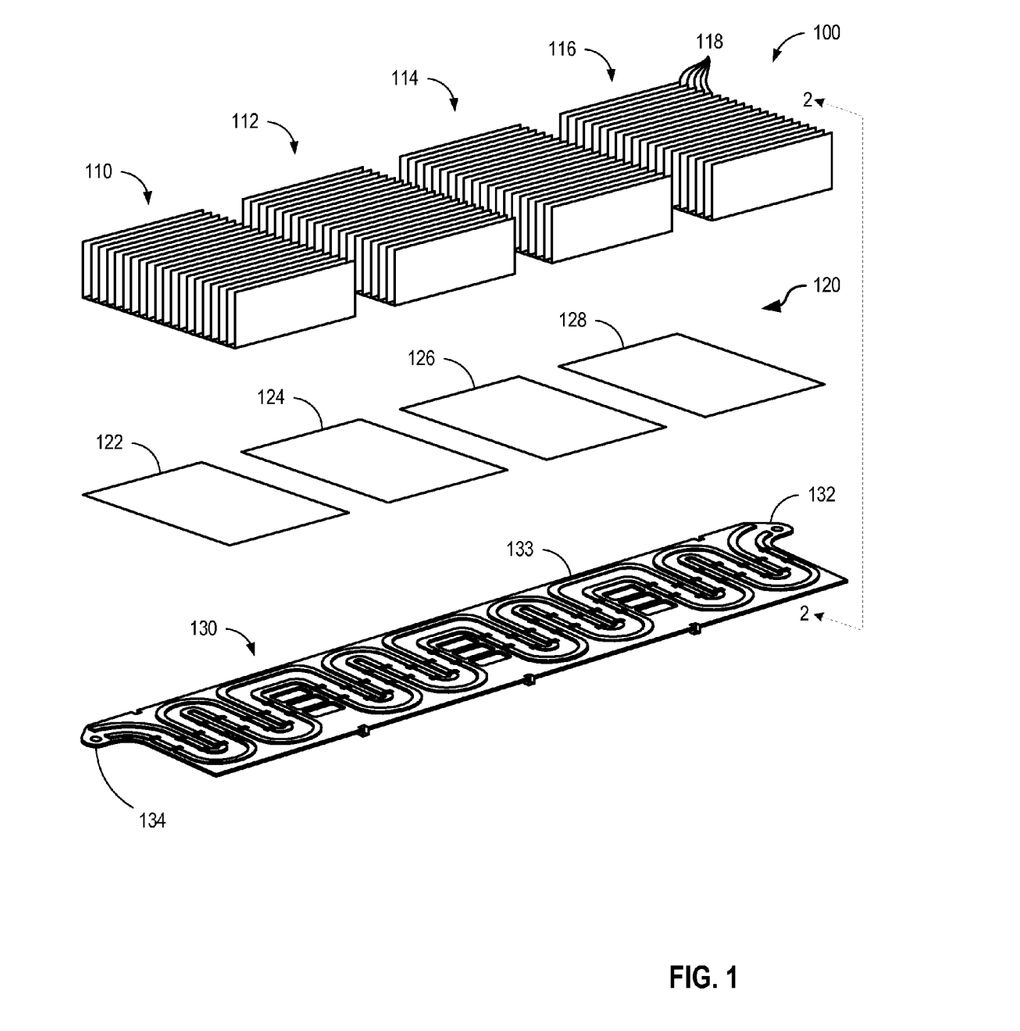
FIG. 1 illustrates an exploded view of a system including a thermal interface material consistent with the present disclosure.

FIG. 1 illustrates an exploded view of a system 100 including a layer of thermal interface material 120 disposed between bottom plate 130 and a plurality of modules 110-116 consistent with the present disclosure. FIG. 1 illustrates four modules 110-116, although more or fewer modules may be incorporated into various embodiments. Each of modules 110-116 comprises a plurality of heat transfer elements 118. In the illustrated embodiment, the heat transfer elements comprise a plurality of fins. Although fins are illustrated in FIG. 1, other heat transfer elements such as fins, radiators, fans, heat pipes, liquid cooling elements, phase-change cooling elements, and/or other features may also be used.

In the embodiment illustrated in FIG. 1, the plurality of heat transfer elements 118 may be configured to couple to a battery system (not shown). The plurality of heat transfer elements 118 may be in contact with, or in proximity to a plurality of cells of the battery. The battery system may generate heat as a byproduct of electrochemical processes through which energy is generated by and/or stored in the battery. The heat sources contemplated by the present disclosure are not limited to battery systems, but may include a variety of other systems, such as combustion engines, electrical components, etc.

A bottom plate 130 may be configured to receive a flow of cooled liquid at an inlet 132. The liquid may be cooled in certain embodiments using a radiator and/or using an active cooling system. In one specific embodiment, the liquid flowing through bottom plate 130 may be a mixture of water and an antifreeze, such as Ethylene glycol or Propylene glycol.

In the illustrated embodiment, the liquid may collect heat from the modules 110-116 as it flows through a serpentine channel 133 in bottom plate 130 and toward an outlet 134. The liquid flowing out of outlet 134 may be heated as a result of heat transfer from the plurality of modules 110-116. In the illustrated embodiment, bottom plate 130 may be coupled to a cooling system (not shown). In one embodiment, the cooling system may comprise a radiator configured to transfer heat to the environment using a flow of air.

In an alternative embodiment, system 100 may be used to cool a flow of hot liquid by passing the hot liquid through bottom plate 130. The heat from the liquid may be transferred to the plurality of heat transfer elements 118, which in turn, may transfer the heat to the environment. The transfer of heat to the environment may be accomplished, for example, by passing a flow of air over heat transfer elements 118.

A layer of thermal interface material 120 may be disposed between bottom plate 130 and modules 110-116. In the illustrated embodiment, the layer of thermal interface material 120 is separated into four sections 122-128, which are associated with modules 110-116, respectively. The thermal interface material 120 may comprise a woven material made of a variety of materials having relatively high thermal conductivity values. According to some embodiments, such materials may include aluminum, copper, plated steel, and/or combinations thereof. The thermal interface material 120 may comprise a relatively thin layer. In one particular embodiment, the thermal interface material may have a thickness of about 1±0.5 mm. As one of skill in the art will appreciate, however, the thickness of the thermal interface material may be greater than 1.5 mm or less than 0.5 mm depending upon the particular application.

Figure 2:
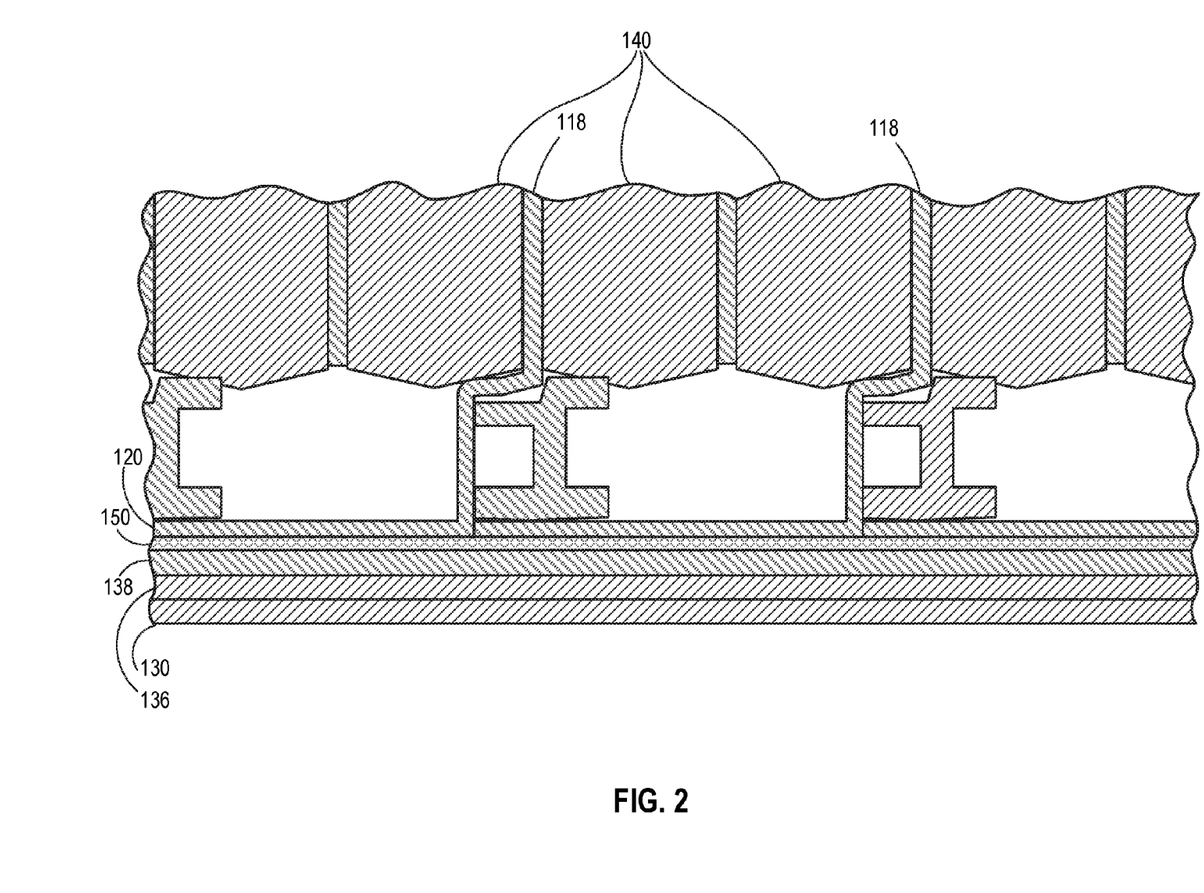
FIG. 2 illustrates a cross sectional view of the system of FIG. 1 taken long line 2-2 consistent with the present disclosure.

FIG. 2 illustrates a cross sectional view of the system 100 of FIG. 1 taken long line 2-2 consistent with the present disclosure. A thermal interface material 150 is disposed between a plurality of heat transfer elements 118 and a top plate 138, which is not specifically illustrated in FIG. 1. Top plate 138 may, in conjunction with bottom plate 130 maintain a liquid 136 within a channel, such as serpentine channel 133, as illustrated in FIG. 1.

Returning to a discussion of FIG. 2, the thermal interface material 120 may be disposed between the top plate 138 and the plurality of heat transfer elements 118. The plurality of heat transfer elements 118 may be disposed in contact with a plurality of cells 140 of a battery system. The plurality of heat transfer elements may collect heat from the plurality of cells that is generated by an electrochemical processes associated with charging and discharging the cells. As discussed in connection with FIG. 1, the heat collected by the plurality of heat transfer elements 118 may be transferred to the liquid 136 flowing between the top plate 138 and bottom plate 130.

Figure 3:
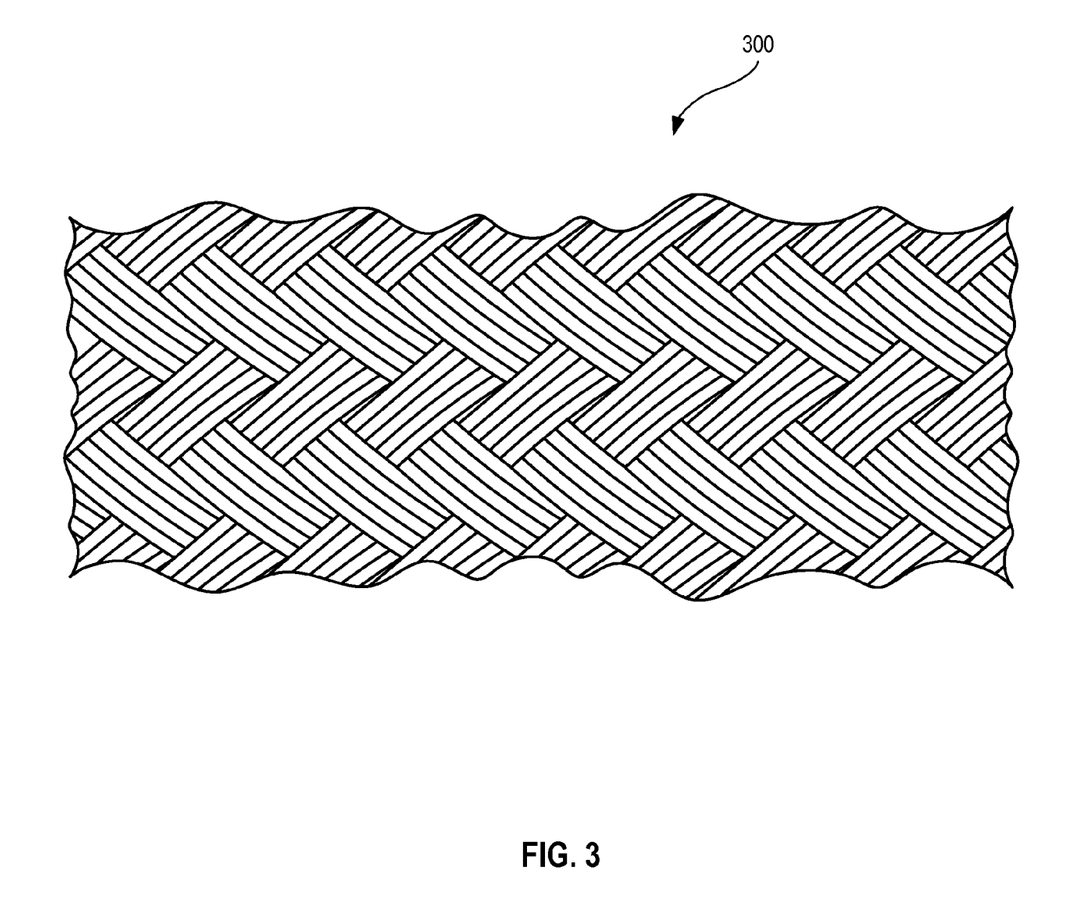
FIG. 3 illustrates a top view of a thermal interface material consistent with the present disclosure.

FIG. 3 illustrates a top view of a thermal interface material 300 consistent with the present disclosure. Thermal interface material 300 may be formed of a large number of strands of thermally conductive material woven into a pattern. In the embodiment illustrated in FIG. 3, the strands are woven in a braided pattern. Other patterns of thermal interface materials are also contemplated, such as a plain weave, a twill weave, and/or the like.

Thermal interface material 300 may be configured such that the strands of thermally conductive material are substantially parallel to contact surfaces of a heat source (not shown) and a heat sink (not shown). For example, if thermal interface material 300 is used in place of thermal interface material 120, as illustrated in FIG. 1, the individual threads may be substantially disposed in a plane that is substantially parallel to a plane of a contact surface associated with modules 110-116. Further, the individual threads may be disposed in a plane that is substantially in parallel to a plane of a contact surface associated with bottom plate 130.

Figure 4A:
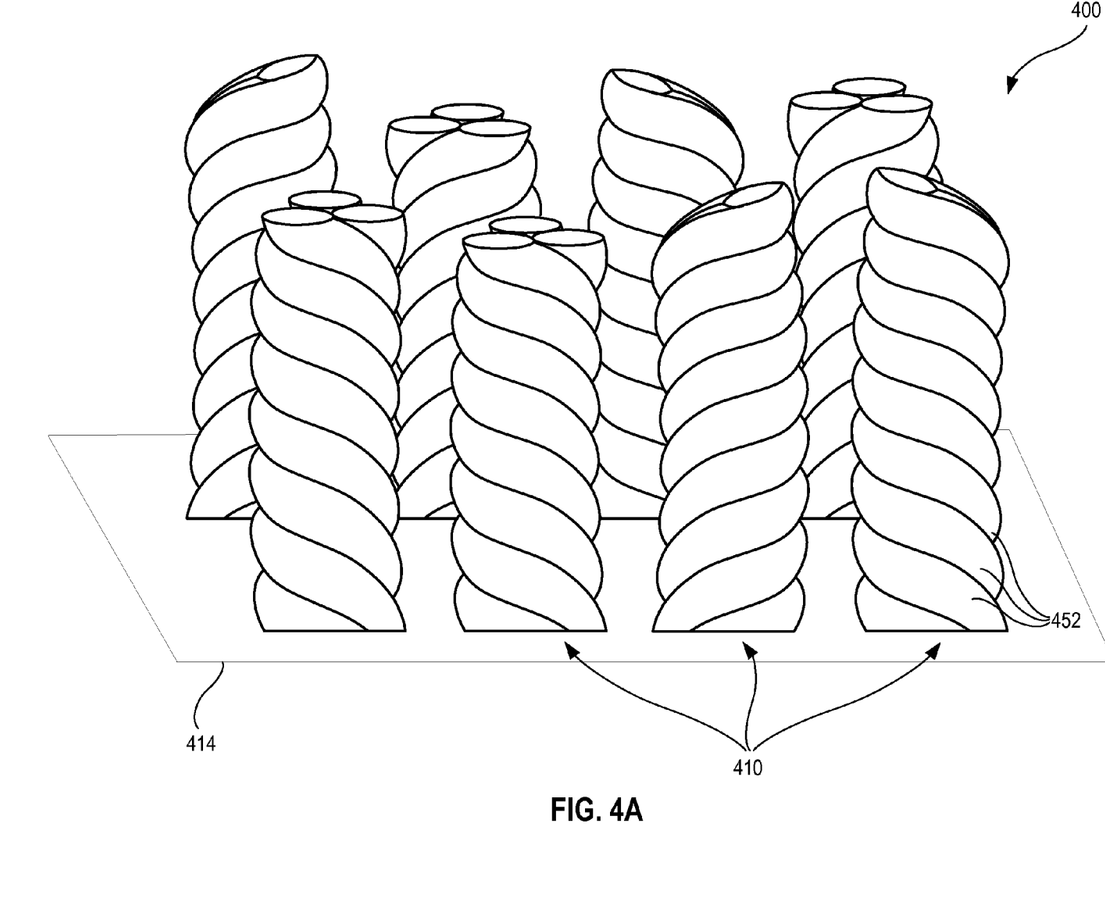
FIG. 4A illustrates a perspective view of a thermal interface material in which a plurality extensions, each of which comprise a plurality of wound threads, extend from one side of a binder layer consistent with the present disclosure.

FIG. 4A illustrates a perspective view of a thermal interface material 400 in which a plurality extensions 410, each of which comprise a plurality of wound threads 452, extend from one side of a binder layer 414 consistent with the present disclosure. Space between the plurality of extensions 410 and/or flexibility of the plurality of extensions 410 may allow for compression of thermal interface material 400. Further, the plurality of extensions 410 may selectively deform under pressure against an adjacent surface. The deformation of the plurality of extensions 410 may create a relatively large number of points of physical contact and/or a large surface area in physical contact with the adjacent surface.

Thermal interface material 400 may be configured such that the plurality of extensions 410 is substantially perpendicular to contact surfaces of a heat source (not shown) and a heat sink (not shown). For example, if thermal interface material 400 is used in place of thermal interface material 120, as illustrated in FIG. 1, the plurality of extensions 410 may be substantially disposed in a plane that is substantially perpendicular to a plane of a contact surface associated with modules 110-116.

Figure 4B:
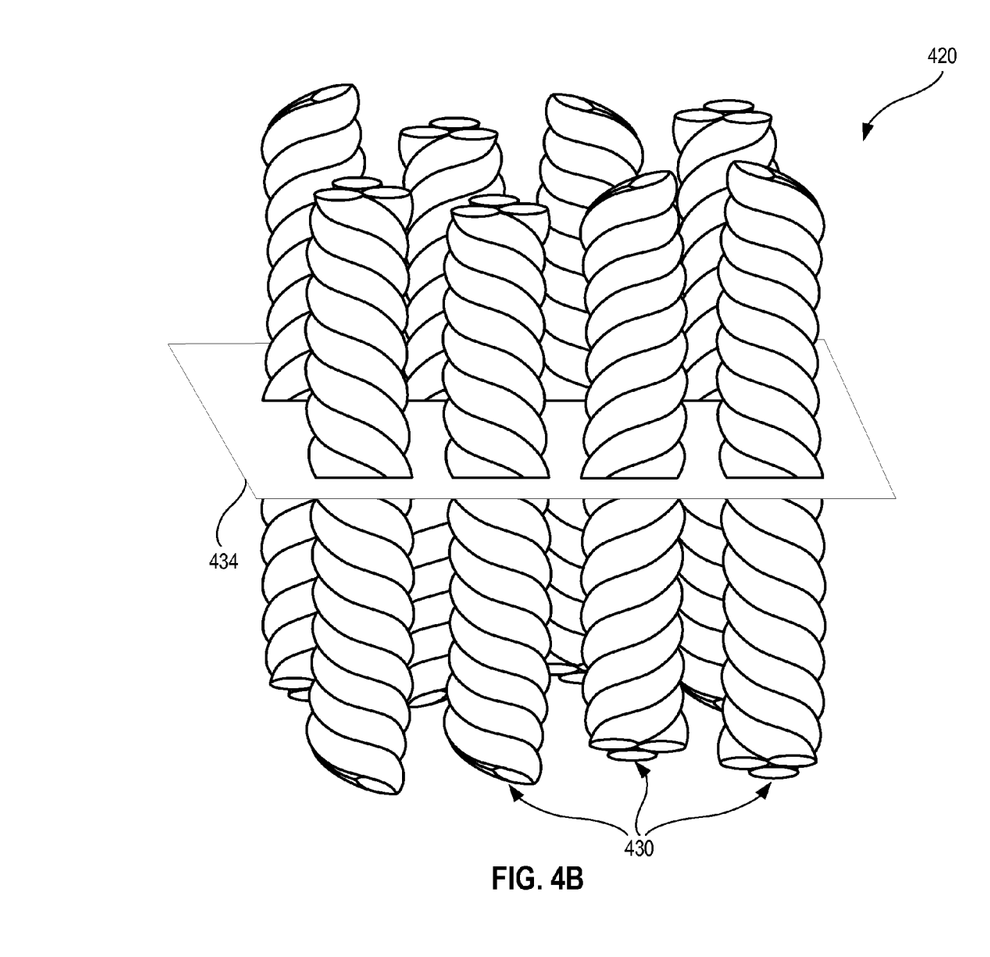
FIG. 4B illustrates a perspective view of a thermal interface material in which a plurality of wound threads extend from both sides of a binder layer consistent with the present disclosure.

FIG. 4B illustrates a perspective view of a thermal interface material 420 in which a plurality of wound threads extend from both sides of a binder layer 434 consistent with the present disclosure. As described above in connection with FIG. 4A, space between the plurality of extensions 430 and/or flexibility of the plurality of extensions 430 may allow for compression of thermal interface material 420. Further, the plurality of extensions 430 may selectively deform under pressure against an adjacent surface. The deformation of the plurality of extensions 430 may create a relatively large number of points of physical contact and/or a large surface area in physical contact with the adjacent surface.

Figure 4C:
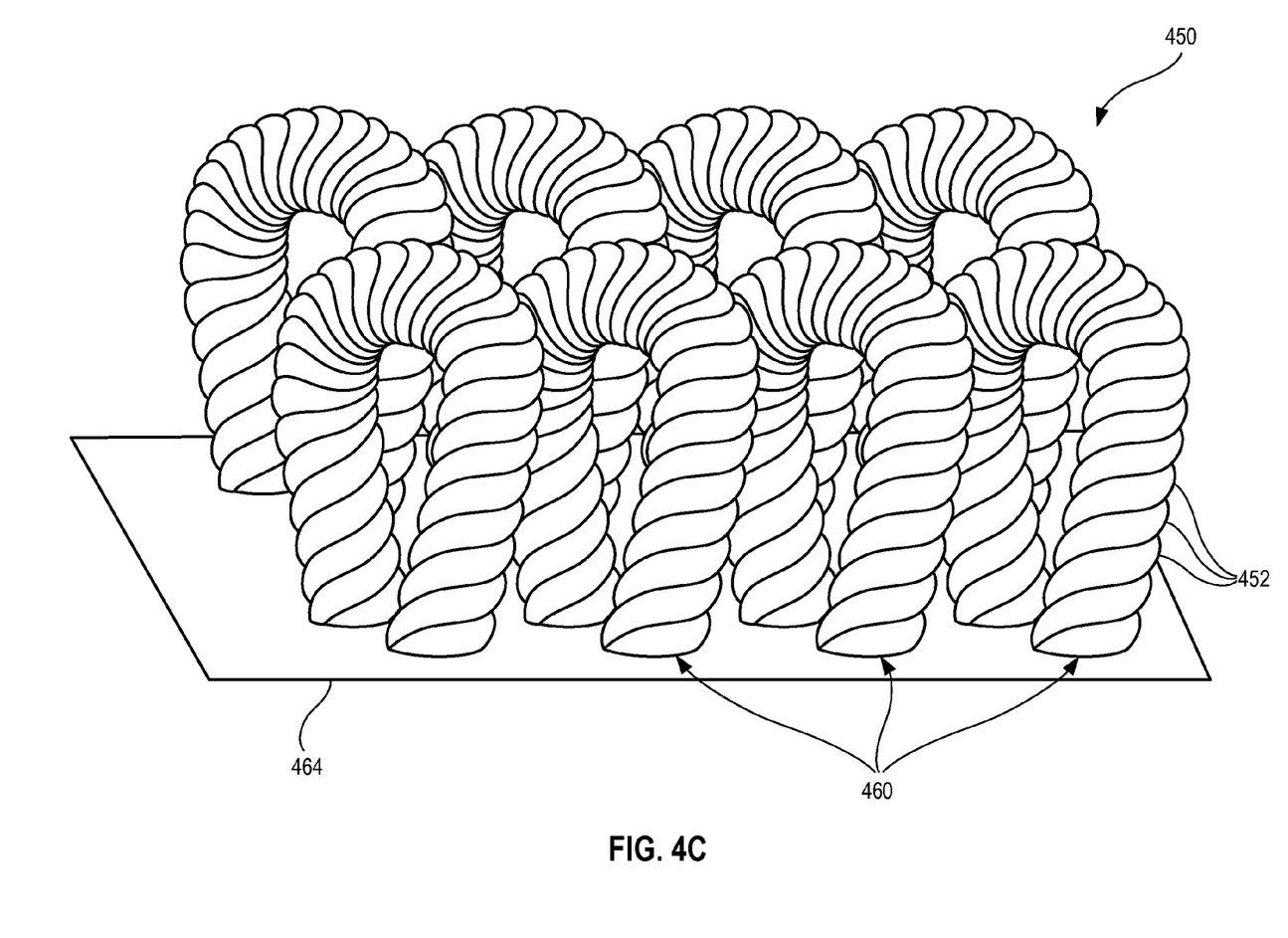
FIG. 4C illustrates a perspective view of a thermal interface material in which a plurality loops, each of which is formed by a plurality of threads, extend from one side of a binder layer consistent with the present disclosure.

FIG. 4C illustrates a perspective view of a thermal interface material 450 in which a plurality loops 460, each of which is formed by a plurality of threads 452 consistent with the present disclosure. In the illustrated embodiment, the plurality of loops 460 extends from one side of a binder layer 464. In alternative embodiments, loops may extend from both sides of the binder layer.

The plurality of loops 460 may allow for compression of thermal interface material 450. Further, the plurality of loops 460 may selectively deform under pressure against an adjacent surface. The deformation of the plurality of loops 460 may create a relatively large area of physical contact with the adjacent surface. The relatively large area of physical contact and the thermal conductivity of the plurality of threads 452 may each serve to increase the heat transfer properties of thermal interface material 450.

According to still another embodiment, a plurality of fine metal strands may be bundled together in a variety of ways. In one particular embodiment, fine metal strands may be formed by a drawing process that reduces a rod to a fine strand. According to some embodiments, the fine metal strands may have a width between approximately 0.01 millimeters and 0.2 millimeters. Friction between the plurality of fine metal strands may maintain the plurality of fine metal strands in a flexible structure. In some embodiments, the plurality of fine metal strands may be folded or twisted to increase the strength of the material.

Figure 5A:
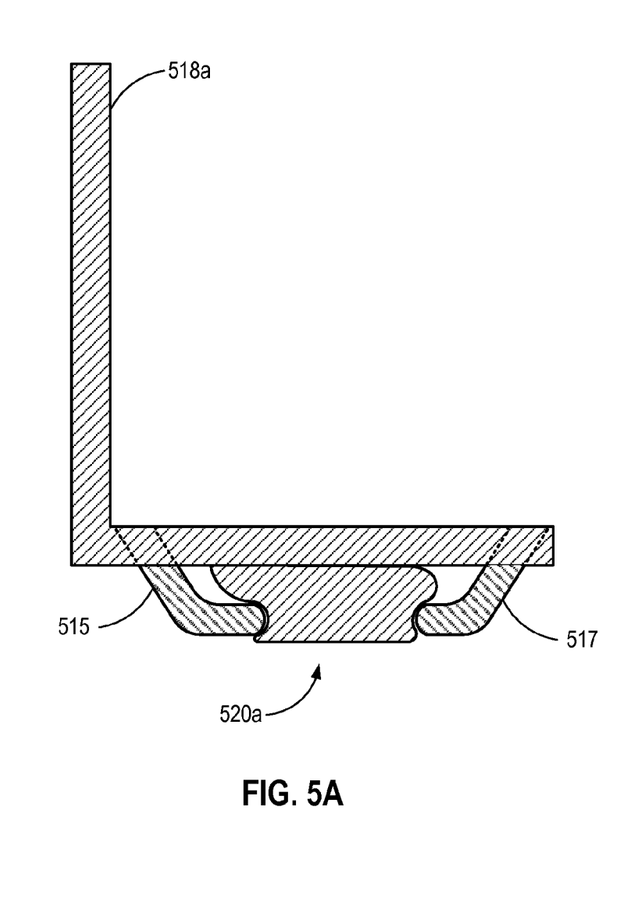
FIG. 5A illustrates a side view of a cooling fin coupled to a thermal interface material having a plurality of extensions consistent with the present disclosure.

FIG. 5A illustrates a side view of a heat transfer element 518a coupled to a thermal interface material 520a having a plurality of extensions 515, 517, consistent with the present disclosure. In the illustrated embodiment, the plurality of extensions 515, 517 may be formed during manufacturing of heat transfer element 518a. In one embodiment, extensions 515, 517 may be formed by stamping. Of course, extensions 515, 517 may be formed in a variety of other ways in various embodiments, which are also contemplated by the present disclosure.

The thermal interface material 520a may be in physical contact with a bottom side of heat transfer element 518a and in physical contact with the plurality of extensions 515, 517. The amount of surface area of thermal interface material 520a in physical contact with the bottom side of cooling fin 518a may be proportionate to the amount of heat that may be transferred from the thermal transfer material 520a to the cooling fin 518a. Accordingly, increasing the surface area of thermal interface material 520a in physical contact with cooling fin 518a may improve heat transfer.

Figure 5B:
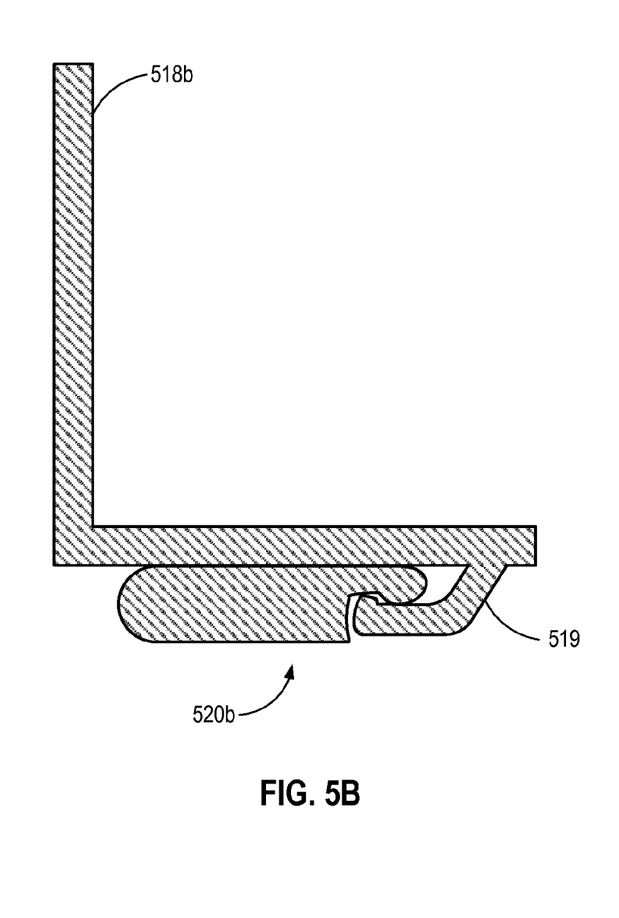
FIG. 5B illustrates a side view of a cooling fin coupled to a thermal interface material having a crimped end consistent with the present disclosure.

FIG. 5B illustrates a side view of a heat transfer element 518b coupled to a thermal interface material 520b having a crimped end 519 consistent with the present disclosure. As in FIG. 5A, the crimped end 519 illustrated in FIG. 5B may be formed by stamping in certain embodiments, but may also be formed in other ways and/or using alternative techniques that are known by individuals skilled in the art.

The plurality of extensions 515, 517 illustrated in FIG. 5A and the crimped end 519 illustrated in FIG. 5B are examples of connection elements that may be configured to secure a thermal interface material to a heat transfer element, such as heat transfer elements 518a, 518b. In some embodiments, such as those illustrated in FIGS. 5A and 5B, the connection elements may comprise an integral portion of a heat transfer element. In alternative embodiments, a variety of connection elements may be used, including mechanical fasteners (e.g., rivets, adhesives) and other techniques, such as soldering and brazing.

Figure 6A:
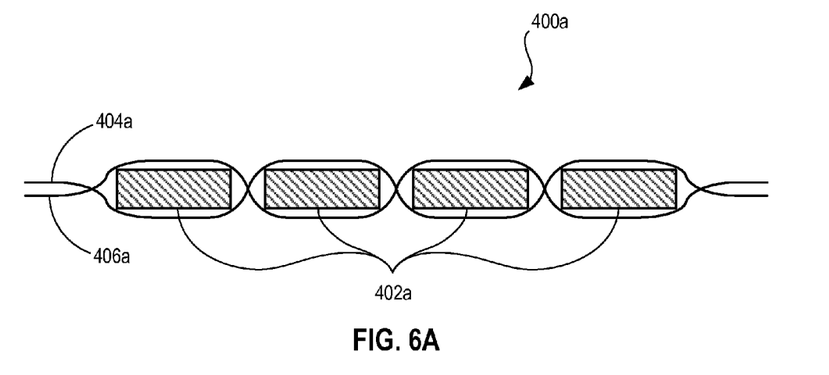
FIG. 6A illustrates a cross-sectional view of a thermal interface material showing a plurality of spacing components around which a plurality of wires are woven consistent with the present disclosure.

FIG. 6A illustrates a cross-sectional view of a thermal interface material 400a showing a plurality of spacing components 402a around which a plurality of wires are woven consistent with the present disclosure. The thermal interface material 400a may be disposed between a heat source and a heat sink and may be configured to increase the area of physical contact between the heat source and the heat sink and to thereby increase the heat transfer between the heat source and the heat sink. In the illustrated embodiment, the spacing components 402a have an approximately rectangular cross section. Threads 404a, 406a are woven around the spacing components 402a.

Figure 6B:
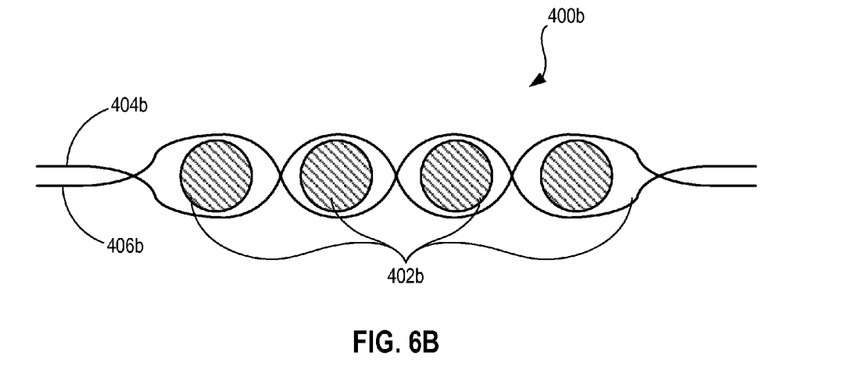
FIG. 6B illustrates a cross-sectional view showing a plurality of spacing components having an approximately circular cross-section around which a plurality of wires are woven consistent with the present disclosure.

FIG. 6B illustrates a cross-sectional view showing a plurality of spacing pieces having an approximately circular cross-section around which a plurality of wires are woven consistent with the present disclosure. In the illustrated embodiment, the spacing components 402b have an approximately circular cross section.

In one embodiment, the spacing components 402a, 402b are selected to accommodate elastic deformation within a predetermined range. Accordingly, the spacing components 402a, 402b may permit thermal interface materials 400a, 400b, respectively, to have elastic or resilient properties. Such elastic or resilient properties may permit thermal interface materials 400a, 400b to flex and/or compress to accommodate variations in the surfaces of a heat source (not shown) and heat sink (not shown) that are in contact with thermal interface material 400a, 400b.

The spacing components 402a, 402b may, in certain embodiments, comprise a polymer. In one specific embodiment, the spacing components 402a, 402b may comprise a polystyrene foam. Although FIGS. 6A and 6B illustrate rectangular and circular spacing components, respectively, other embodiments consistent with the present disclosure may include spacing components in a variety of configurations. For example, in various embodiments spacing components have regular or irregular polygonal shapes. Further, in some embodiments, the spacing components may be embodied as a plurality of discrete spheres or other shapes, rather than extending along a major axis that is substantially greater than a minor axis.

Threads 404a, 404b, 406a, and 406b may be embodied using a variety of materials. Some exemplary materials include copper, aluminum, plated steel, and combinations thereof. Alternative embodiments may further include threads made of any thermally conductive material. In certain embodiments, threads 404a, 404b, 406a, and 406b may have a diameter of approximately 20 to 400 micrometers.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system for heat dissipation in a battery, comprising:
 a rechargeable battery system that generates heat as a result of electrochemical processes relating to storage of electrical energy in the rechargeable battery system and extraction of electrical energy from the rechargeable battery system;
 a plurality of heat transfer elements in communication with the rechargeable battery system and configured to receive heat from the rechargeable battery system, the plurality of heat transfer elements in communication with a first contact surface;
 a cooling system in communication with the plurality of heat transfer elements, the cooling system in communication with a second contact surface;
 a thermal interface material disposed between a first contact surface and the second contact surface, the thermal interface material comprising a plurality of strands of thermally conductive material woven into a pattern such that each of the plurality of strands has a length that extends perpendicular to the first contact surface and the second contact surface;
 wherein the thermal interface material is configured to conform to the first contact surface and the second contact surface by deformation of the length of at least a portion of the strands and thereby increase transference of heat between the first contact surface and the second contact surface.

2. The system of claim 1, wherein the rechargeable battery system comprises a plurality of electrochemical cells and the plurality of heat transfer elements comprise a plurality of heat transfer elements in communication with the plurality of electrochemical cells.

3. The system of claim 1, wherein the cooling system comprises a flow assembly configured to receive a flow of cooled liquid and the first contact surface comprises a surface of the flow assembly.

4. The system of claim 1, wherein rechargeable battery system comprises a plurality of electrochemical cells and the plurality of heat transfer elements comprise a plurality of cooling fins in communication with the plurality of electrochemical cells.

5. The system of claim 1, wherein the at least one of the plurality of heat transfer elements comprises a connection element configured to secure the heat transfer element to the thermal interface material.

6. The system of claim 5, wherein the connection element comprises an integral portion of the heat transfer element configured to be crimped against the thermal interface material.

7. The system of claim 1, further comprising:
a plurality of spacing components;
wherein the plurality of strands of thermally conductive material are woven in the pattern around the plurality of spacing components.

8. The system of claim 7, wherein the plurality of spacing components are configured to accommodate elastic deformation.

9. The system of claim 1, wherein the thermal interface material further comprises a binder layer and the plurality of strands of thermally conductive material are joined to the binder layer.

10. The system of claim 1, wherein the thermally conductive material comprises one of aluminum, copper, and plated steel.

11. A system for heat dissipation in a battery, comprising:
a rechargeable battery system that generates heat as a result of electrochemical processes relating to storage of electrical energy in the rechargeable battery system and extraction of electrical energy from the rechargeable battery system;
a plurality of heat transfer elements in communication with the rechargeable battery system and configured to receive heat from the rechargeable battery system, the plurality of heat transfer elements in communication with a first contact surface;
an active cooling system configured to circulate a cooled liquid and in communication with the plurality of heat transfer elements, the cooling system in communication with a second contact surface;
a thermal interface material disposed between a first contact surface and the second contact surface, the thermal interface material comprising a plurality of strands of thermally conductive material woven into a pattern such that each of the plurality of strands has a length that extends perpendicular to the first contact surface and the second contact surface;
wherein the plurality of strands of thermally conductive material woven into a pattern are configured to conform to the first contact surface and the second contact surface by deformation of the length of at least a portion of the strands and the second contact surface and thereby increase transference of heat between the first contact surface and the second contact surface.

* * * * *